US009122683B1

(12) United States Patent  (10) Patent No.: US 9,122,683 B1
Azarm et al.  (45) Date of Patent: *Sep. 1, 2015

(54) SYSTEM AND METHOD OF LINKING MEDIA CONTENT INFORMATION

(71) Applicant: Amazon Technologies, Inc., Reno, NV (US)

(72) Inventors: Houman Azarm, San Francisco, CA (US); Erich Ringewald, Belvedere, CA (US); Michael Yang, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/083,255

(22) Filed: Nov. 18, 2013

Related U.S. Application Data

(63) Continuation of application No. 12/122,364, filed on May 16, 2008, now Pat. No. 8,595,232.

(51) Int. Cl.
*G06F 17/30* (2006.01)
(52) U.S. Cl.
CPC .............................. *G06F 17/30023* (2013.01)
(58) Field of Classification Search
CPC .................................................. G06F 17/30023
USPC ........................................ 707/737, 738, 740
See application file for complete search history.

(56) References Cited

U.S. PATENT DOCUMENTS

| 5,963,916 | A | 10/1999 | Kaplan |
| 6,226,618 | B1 | 5/2001 | Downs et al. |
| 7,509,347 | B2 * | 3/2009 | Chambers ............................ 1/1 |
| 2005/0086265 | A1 * | 4/2005 | Sato ........................... 707/104.1 |
| 2005/0091069 | A1 * | 4/2005 | Chuang ............................... 705/1 |
| 2006/0218292 | A1 * | 9/2006 | Woodward et al. ........... 709/229 |
| 2007/0003223 | A1 * | 1/2007 | Armstrong et al. ............. 386/95 |

OTHER PUBLICATIONS

Office action for U.S. Appl. No. 12/122,364, mailed on Mar. 12, 2013, Azarm et al., "System and Method of Linking Media Content Information", 19 pages.
Non-Final Office Action for U.S. Appl. No. 12/122,364, mailed on Apr. 18, 2012, Hourman Azarm et al., "System and Method of Linking Media Content Information", 17 pages.
Final Office Action for U.S. Appl. No. 12/122,364, mailed on Aug. 24, 2012, "System and Method of Linking Media Content Information", 18 pages.

(Continued)

*Primary Examiner* — Jorge A Casanova
(74) *Attorney, Agent, or Firm* — Lee & Hayes, PLLC

(57) ABSTRACT

Systems and methods of linking media content information are provided. A particular method of linking media content information includes receiving data including first descriptive information associated with an electronic version of particular media content. The method also includes searching a database, based on the first descriptive information, to identify second descriptive information. The second descriptive information is associated with a physical media product and the physical media product stores the particular media content. Additionally, the method includes storing a data record in memory relating the electronic version of the particular media content to the second descriptive information.

20 Claims, 6 Drawing Sheets

(56) References Cited

OTHER PUBLICATIONS

Final Office Action U.S. Appl. No. 12/122,364, mailed on Aug. 24, 2011, "System and Method of Linking Media Content Information", 18 pages.

Walmart.com—Music Downloads, http://musicdownloads.walmart.com/catalog/servlet/AlbumServlet?id=466403, printed Apr. 24, 2008, 3 pages.

Walmart.com: Hannah Montana 2/Meet Miley Cyrus (2CD), http://www.walmart.com/catalog/product.do?product_id=58870997, printed Apr. 24, 2008, 6 pages.

* cited by examiner

SYSTEM AND METHOD OF LINKING MEDIA CONTENT INFORMATION

This application is a continuation of, and claims priority to U.S. patent application Ser. No. 12/122,364, filed May 16, 2008. The entirety of which is incorporated herein by reference. Any disclaimer that may have occurred during the prosecution of the above-referenced application is hereby expressly rescinded, and reconsideration of all relevant art is respectfully requested.

FIELD OF THE DISCLOSURE

The present disclosure is generally related to linking media content information.

BACKGROUND

Purchasing physical media products, such as compact discs (CDs) and digital video discs (DVDs), from online stores has been an option for consumers for quite some time. A wealth of information regarding the physical media products available for purchase online has been accumulated by online stores and media information collection agencies, such as All Music Guide (AMG). Consumers can use this information, such as reviews and pricing information, to make decisions about physical media product purchases. As higher data transfer rates have become more accessible to consumers, downloading of electronic media products has increased. Therefore, instead of purchasing a physical media product from an online store and having it shipped to them, consumers can download an electronic media product representing the same media content as a corresponding physical media product. However, information associated with an electronic media product may not be as abundant as information regarding the corresponding physical media product. Additionally, information regarding the particular physical media product may not be conveniently available to consumers wanting to download a corresponding electronic media product.

DETAILED DESCRIPTION

Figure 1:
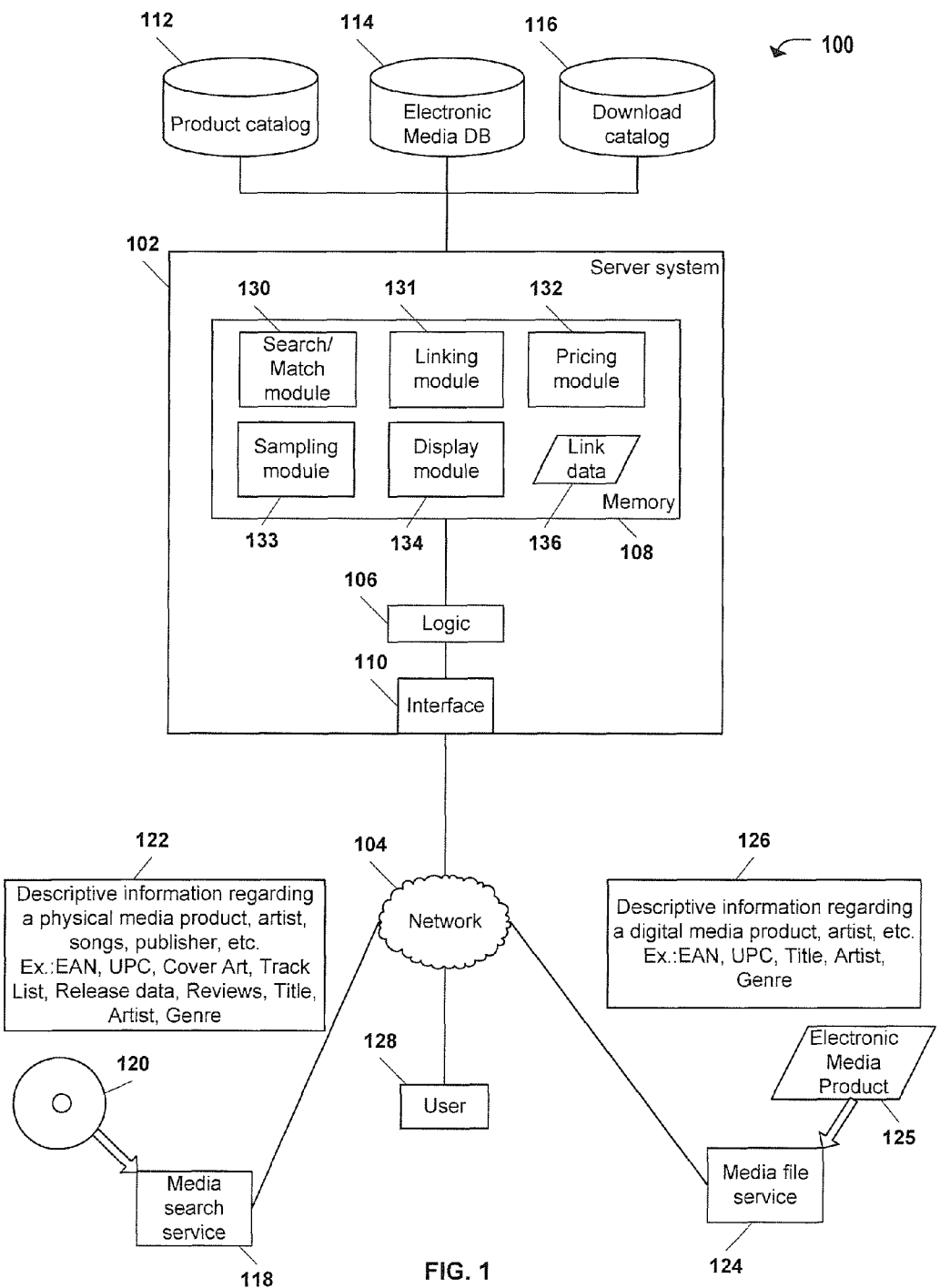
FIG. 1 is a block diagram of an embodiment of a system to link media content information.

Systems and methods of linking media content information are disclosed. In a particular embodiment, a system to link media content information includes a product catalog including information regarding physical media products that store media content for playback. The system also includes a download catalog including information regarding digital media products related to media content available for download. Additionally, the system includes a pricing module to automatically determine a price for download of particular media content via the download catalog based at least partially on a price associated with a physical media product of the product catalog, where the physical media product includes the particular media content.

In another particular embodiment, a system to link media content information includes an electronic media database including a plurality of digitally encoded audio data files offered for download. The system also includes a product catalog including descriptive information about a plurality of physical media products offered for sale, where each of the physical media products stores audio data. Additionally, the system includes a linking module to store a data record relating a first of the digitally encoded audio data files to descriptive information associated with a first of the physical media products. Further, the system includes a display module to send display data to generate a user interface display including the descriptive information about the first physical media product. The user interface display includes a user selectable sample link based on the data record. In addition, receiving data indicating a selection of the user selectable sample link causes a sample portion of the first digitally encoded audio data file to be accessed from the electronic media database for playback.

In another particular embodiment, a method of linking media content information includes receiving data including first descriptive information associated with an electronic version of particular media content. The method also includes searching a database, based on the first descriptive information, to identify second descriptive information. The second descriptive information is associated with a physical media product and the physical media product stores the particular media content. Additionally, the method includes storing a data record in memory relating the electronic version of the particular media content to the second descriptive information.

In another particular embodiment, a computer-readable medium to link media content information includes instructions that, when executed by a processor, cause the processor to search a database, based on first descriptive information associated with an electronic version of particular media content, to identify second descriptive information. The second descriptive information is associated with a physical media product and the physical media product stores the particular media content. The computer readable medium also includes instructions that, when executed by the processor, cause the processor to store a data record relating the electronic version of the particular media content to the second descriptive information.

FIG. 1 depicts a particular embodiment of a system 100 to link media content information. The system 100 includes a server system 102 having logic 106 and memory 108. The logic 106 may include one or more processors and the memory 108 may include a medium readable by the logic 106. The memory 108 includes one or more modules 130-134 executable by the logic 106 to implement one or more functions of the server system 102. In one embodiment, each of the modules 130-134 may represent instructions embodied in one or more software programs stored at the memory 108. In another embodiment, the modules 130-134 can represent hardware, software instructions, or any combination thereof. The memory 108 also stores link data 136. The memory may include memory local to the logic 106 (such as a random access memory (RAM) or another computer data storage at the server system 102. The memory may also include one or more data storage systems remote from the server system 102 that are accessible to the logic 106, such as, but not limited to a product catalog 112, an electronic media database 114, and a download catalog 116.

Additionally, the server system 102 includes an interface 110 to facilitate data exchange between the server system 102 and one or more devices via a network 104. The network 104 may include a local area network, a wide area network, a public Internet Protocol (IP) network, a private IP network, or any combination thereof. The server system 102 communicates with a media search service 118, such as All Media Guide (AMG), via the network 104. The server system 102 may receive information from the media search service 118 related to one or more physical media products, such as a physical media product 120. In an illustrative embodiment, the physical media product 120 may be available for purchase via an online media store. The physical media product 120 may include a compact disc (CD), a digital video disc (DVD), a vinyl album, a Blu-ray disc, a cassette tape, another physical medium that stores audio data, video data, or both. The information sent to the server system 102 from the media search service 118 may be descriptive information 122 regarding the physical media product 120. The descriptive information 122 may include a universal product code (UPC), a European article number (EAN), a title, an artist, a genre related to the physical media product 120, cover art, a track list, release data, reviews, a content rating, other information descriptive of the physical media product 120, or any combination thereof.

The server system 102 also communicates with an media file service 124 via the network 104. The server system 102 may receive electronic media products, such as the electronic media product 125, from the media file service 124. The electronic media product 125 may include one or more digitally encoded electronic media files related to particular media content. For example, the electronic media product 125 may include an electronic album; electronic video content, such as a movie or television program; a digitally encoded electronic audio file including a particular song; other media content; or any combination thereof. In a particular embodiment, the electronic media product 125 may include an electronic version of media content included on the physical media product 120. The electronic media product 125 may be formatted according to a Motion Picture Experts Group (MPEG) 1 Audio Layer 3 (MP3) format; an MPEG video format; such as an MPEG 4 or MPEG 2 related format; an advanced audio coding (AAC) format; a Windows media audio (WMA) format; a Windows media video (WMV) format; a RealVideo format; a RealAudio format; a Vorbis format, or any other digital media format. The server system 102 may also receive descriptive information 126 from the media file service 124 related to the electronic media product 125. The descriptive information 126 may include a UPC, an EAN, a title, an artist, a genre, a title, or any combination thereof.

Further, the server system 102 communicates with one or more users, such as the user 128, via the network 104. The server system 102 may receive requests from the user 128 to access information related to media content. For example, the user 128 may communicate with the server system 102 to purchase a physical media product, such as a CD or DVD, or to download an electronic media product, such as an MP3 file or a vide file, from an online media store. The user 128 may communicate with the server system 102 via a wireless communication device (such as a mobile phone, a smart phone, or a personal digital assistant (PDA)), a personal computer, a laptop computer, or another computing device.

In a particular embodiment, the product catalog 112 includes information regarding physical media products that store media content for playback. For example, the product catalog 112 may include the descriptive information 122 received from the media search service 118 regarding the physical media product 120. Additionally, the product catalog 112 may include additional information regarding physical media products, such as reviews submitted by the users, the availability of physical media products for purchase, pricing information related to physical media products, other information related to the physical media products, or any combination thereof.

The electronic media database 114 includes one or more copies of electronic media content received from the media file service 124. The electronic media content stored at the electronic media database 114 may be available for purchase via the download catalog 116. The download catalog 116 may include descriptive information received from the media file service 124 related to electronic media content stored at the electronic media database 114. Additionally, the download catalog 116 may include information received from one or more users, such as user reviews.

In a particular embodiment, the search/match module 130 searches a database based on descriptive information associated with an electronic version of media content in order to match electronic media content with a corresponding physical media product. The search/match module 130 may perform the search periodically, upon request, or any combination thereof. For example, on a daily basis, the search/match module 130 may execute a matching session by parsing through the list of electronic media content associated with the download catalog 116 and attempting to match each item in the download catalog 116 with a physical media product included in the product catalog 112. In one embodiment, the search/match module 130 may attempt to find a matching physical media product for an electronic version of a particular song. In another embodiment, the search/match module 130 may attempt to match an electronic album including a number of songs with a corresponding physical media product, such as a compact disc. In another embodiment, the search/match module 130 may attempt to match an electronic version of a movie with a corresponding physical media product, such as a DVD.

In an illustrative embodiment, the search/match module 130 retrieves an identifier, such as a universal product code (UPC), of the electronic media product 125 from the download catalog 116 and attempts to look up the UPC for a corresponding physical media product in the product catalog 112. For example, the search/match module 130 may look up the UPC for an electronic version of The Beatles White Album and then query the product catalog 112 for the same UPC number. If a matching UPC is not found, then the search/match module 130 may attempt to match a European article number (EAN) of the electronic media product 125 with an EAN stored at the product catalog 112. When no matching UPC or EAN is identified, the search/match module 130 may attempt to match a vendor identification number provided by the media file service 124.

The search/match module 130 may also be adapted to attempt to match additional descriptive information regarding the electronic media product 125 with descriptive information regarding a physical media product. For example, the search/match module 130 may generate search terms from the descriptive information 126 in an attempt to match the electronic media product 125 with a physical media product. In an illustrative embodiment, when the search/match module 130 is not able to perform a successful lookup with respect to the UPC, BAN, vendor identification number, or any combination thereof, the search/match module 130 compares a title of the electronic media product 125, a primary artist associated with the electronic media content 125, or any combination thereof, with the titles and/or primary artists related to a number of respective physical media products. A primary artist may represent a band or singer that is responsible for all or a majority of content of the electronic media product 125. The primary artist may also represent one or more actors designated as the main actors in a movie or television show.

Further, the search/match module 130 may compare a simplified title and unmodified primary artist of the electronic media product 125 with simplified titles and unmodified primary artists of a number of physical media products. A simplified title may include a title that has been converted to all capital letters, a title where all punctuation is removed, a title where certain words are removed, such as "the," "and," "volume," or "vol.," a title where all white space is removed, or any combination thereof. Additionally, the search/match module 130 may compare a truncated simplified title and unmodified primary artist of the electronic media product 125 with truncated simplified titles and unmodified primary artists related to a number of physical media products. A truncated simplified title may be a title with any words in parentheses removed or any words following a colon in the title removed. In one example, the search/match module 130 would truncate the title "Mozart for Babies: Soothing Melodies," as "Mozart for Babies." The search/match module 130 may also attempt to match only a truncated simplified title of the electronic media product 125 with titles of a number of physical media products. In addition, the search/match module 130 may compare a truncated title with splits and an unmodified primary artist of the electronic media product 125 with the truncated title with splits and the primary artist of a number of physical media products. For example, a split delimiter may include a slash ("/") symbol and any phrases separated by a slash may be split into different searches. To illustrate, the search/match module 130 may search the title "Beethoven's Symphony No. 9/The Vienna Orchestra," as "Beethoven's Symphony No. 9" and "The Vienna Orchestra." In an illustrative, non-limiting embodiment, the searches explained above may be implemented as a progression of increasingly broader searches or as individual searches.

After executing a matching session, the search/match module 130 may identify a match between the electronic media product 125 and one or more physical media products. When the content of the electronic media product 125 is matched to more than one physical media product, the search/match module 130 may be adapted to pick one of the physical media products that represents the best match with the electronic media product 125. To illustrate, the search/match module 130 may compare the number of tracks of the electronic media product 125 with the number of tracks of the matching physical media products to determine a physical media product that best matches the electronic media product 125. Additionally, the search/match module 130 may compare one or more track titles of the electronic media product 125 with track titles of matching physical media products to identify a physical media product that best matches the electronic media product 125. In a particular embodiment, when no match is identified, no link record is stored for the electronic media product 125 at the link data 136.

In a particular embodiment, the search/match module 130 determines a quality of a match between the electronic media product 125 and a particular physical media product, such as the physical media product 120. For example, the search/match module 130 may measure the quality of a match based on a set of rules established by an administrator. To illustrate, a match between a UPC of the electronic media product 125 and a UPC of the physical media product 120 may be considered a match with a high confidence level. Further, an unmodified title match between the electronic media product 125 and the physical media product 120 may be considered a match with a lower confidence level than the UPC match. Matches between the electronic media product 125 and the physical media product 120 based on simplified titles may represent a match of a lower confidence level than a simplified title match.

Further, the search/match module 130 may be adapted to implement an administrator override function. The administrator override function may allow an administrator to override a match previously identified by the search/match module 130. In an illustrative, non-limiting embodiment, an electronic media product associated with a match override by an administrator is considered the highest quality of match and is only able to be modified by a subsequent administrator override. The administrator may also disable a match, if it is determine that the determined match was incorrect and no correct match exists.

The search/match module 130 may be adapted to determine matches for new electronic media products included in the download catalog 116, verify previous matches for electronic media products included in the download catalog 116, or any combination thereof. For example, the search/match module 130 may identify electronic media products that have been added to the electronic media database 114 after a previous matching session, such as a matching session that took place the previous day, and perform a subsequent matching session for the new electronic media products. In another example, the match/search module 130 may periodically verify pre-existing matches for electronic media products stored at the electronic media database 114. To illustrate, the match/search module 130 may identify electronic media products that are associated with matches to physical media products where the match confidence level is below a specified threshold and perform another matching session to determine whether or not a better match is available for the respective electronic media products. In addition, in an embodiment where multiple electronic media products are matched with a particular physical media product and an administrator override changes the match between one of the electronic media products and the particular physical media product, the search/match module 130 may attempt to identify a new physical media product that best matches the remaining electronic media products.

Additionally, the search/match module 130 may be adapted to execute a matching session to aid in error recovery. For example, an error may occur when a scheduled matching session is terminated prematurely, when the wrong physical media product is chosen to win a match, when a link record relating an electronic media product to a matching physical media product is not established, when an old link between an electronic media product and a physical media products needs to be cleared, but the link is not able to be disconnected, or any combination thereof.

In some embodiments, the search/match module 130 attempts to match descriptive information of the electronic media product 125 with information related to physical media products related to different geographic regions. For example, different regions of the world may assign different identifiers to physical media products. Additionally, different versions of physical media products may have been released in different parts of the world, certain physical media products may have different release dates in different regions, and have different cover art. To illustrate, The Beatles White Album was released in the United Kingdom on Nov. 22, 1968, while the same album was released in the Unites States on Nov. 25, 1968, and the cover art for the album was different from the cover art for the cassette tape. Thus, the search/ match module 130 may match a particular electronic media product to one or more physical media products based on the different versions of the physical media product released in different regions of the world.

In a particular embodiment, the method may include determining whether a physical media product that matches the electronic media product is sellable. For example, the method may determine whether the physical media product is in stock. When the physical media product is not sellable, no link record may be created so that the electronic media product is not linked to a physical media product that cannot be sold.

Although the operations executed via the search/match module 130 have been described in terms of matching an electronic media product with one or more physical media products, the search/match module 130 may be adapted to execute similar operations to match a physical media product with one or more electronic media products.

In a particular embodiment, the linking module 131 creates a link record based on a match between an electronic media product and a physical media product. The link record is a data record relating an electronic media product to descriptive information of one or more physical media products. Additionally, the link record may relate a physical media product to descriptive information of one or more electronic media products. In an illustrative, non-limiting embodiment, the link records may include one or more pointers to the respective descriptive information. The link records generated via the linking module 131 are included in the link data 136.

In an illustrative embodiment, a particular link record may relate the electronic media product 125 to the descriptive information 122 associated with the physical media product 120. Thus, the particular link record may relate the electronic media product 125 to cover art, a listing of tracks, release data, reviews, title, artist, genre, or any combination thereof, of the physical media product 120. The particular link record may also relate the electronic media product 125 to pricing information associated with the physical media product 120. The descriptive information and pricing information of the physical media product 120 linked to the electronic media product 125 may be stored at the product catalog 112.

Further, the particular link record may relate the physical media product 120 to the descriptive information 126 associated with the electronic media product 125, such as a title, artist, genre, or any combination thereof, stored at the download catalog 116. Additionally, the particular link record may relate the physical media product 120 to a sample portion of the electronic media product 125. The sample portion of the electronic media content 125 may be stored at the electronic media database 114.

By generating link records relating information associated with physical media products to electronic media products, users attempting to access information related to an electronic media product may have access to information about the electronic media product, and also information related to a corresponding physical media product. For example, the user 128 may attempt to access information related to the electronic media product 125 before purchasing the electronic media product 125 via an online media store. A link record related to the electronic media product 125 may be utilized to provide the user 128 with access to information related to the matching physical media product, such that the user 128 can read reviews related to both the electronic media product 125 and the matching physical media product and compare pricing information related to the electronic media product 125 with pricing information of new and used matching physical media products. In another example, the user 128 may attempt to access information related to the physical media product 120 and a link record related to the physical media product 120 may be utilized to provide the user 128 with access to sample portions of a matching electronic media product stored at the electronic media database 114. The increased amount of information available to users may prove helpful in making purchasing decisions and increase sales for an online media store.

A link record may also include information that relates the electronic media product 125 to one or more physical products released in different regions of the world. For example, a link record associated with the electronic media product 125 may relate the electronic media product 125 to a portion of the product catalog 112 that includes descriptive information associated with the release of the matching physical media product in the United States and to a portion of the product catalog 112 that includes descriptive information associated with the release of the matching physical media product in Australia.

The pricing module 132 is adapted to determine a price related to purchasing electronic media products based on pricing associated with a physical media product matched to the electronic media product. For example, the pricing module 132 may utilize the link data 136 to access pricing information associated with a CD that is matched to a particular MP3 electronic album and set the price of downloading the MP3 digital album based on the price of the CD. In an illustrative, non-limiting embodiment, the price of downloading the particular digital content may be set lower than the price of the CD. Additionally, the pricing module 132 may consider the price of new physical media products, used physical media products, or any combination thereof, when determining the price of the matching electronic media products. Further, the pricing module 132 may determine the price of downloading a particular portion of an electronic media product, such as downloading one or more digital audio tracks, based on the price of the physical media product matched with the particular electronic media product.

In one embodiment, the pricing information associated with a physical media product and/or an electronic media product may depend on a user accessing the product catalog 112, the download catalog 116, or any combination thereof. To illustrate, an online media store may assign a rating to users of the online media store. The rating may be assigned based on feedback from other users, previous transactions with the online media store, or any combination thereof. In an illustrative, non-limiting embodiment, when a user is associated with a more favorable rating, the price of a physical media product or an electronic media product may be set lower than the price of the same physical media product or electronic media product for a user with a less favorable rating. In another illustration, promotional pricing may be offered to particular users. For example, users with a particular type of account may be offered promotional pricing.

In a particular embodiment, the sampling module 133 determines a sample portion of an electronic media product. For example, the sampling module 133 may determine a sample of an electronic media product that includes a portion of a particular track of an electronic album, such as a 15 second portion of the track. The sampling module 133 may be adapted to store the sample portion of the electronic media product at a data store, such as the electronic media database

114. Additionally, the sampling module 133 may be adapted to store data indicating the sample portion of the electronic media product in a link record related to the electronic media product.

Figure 5:
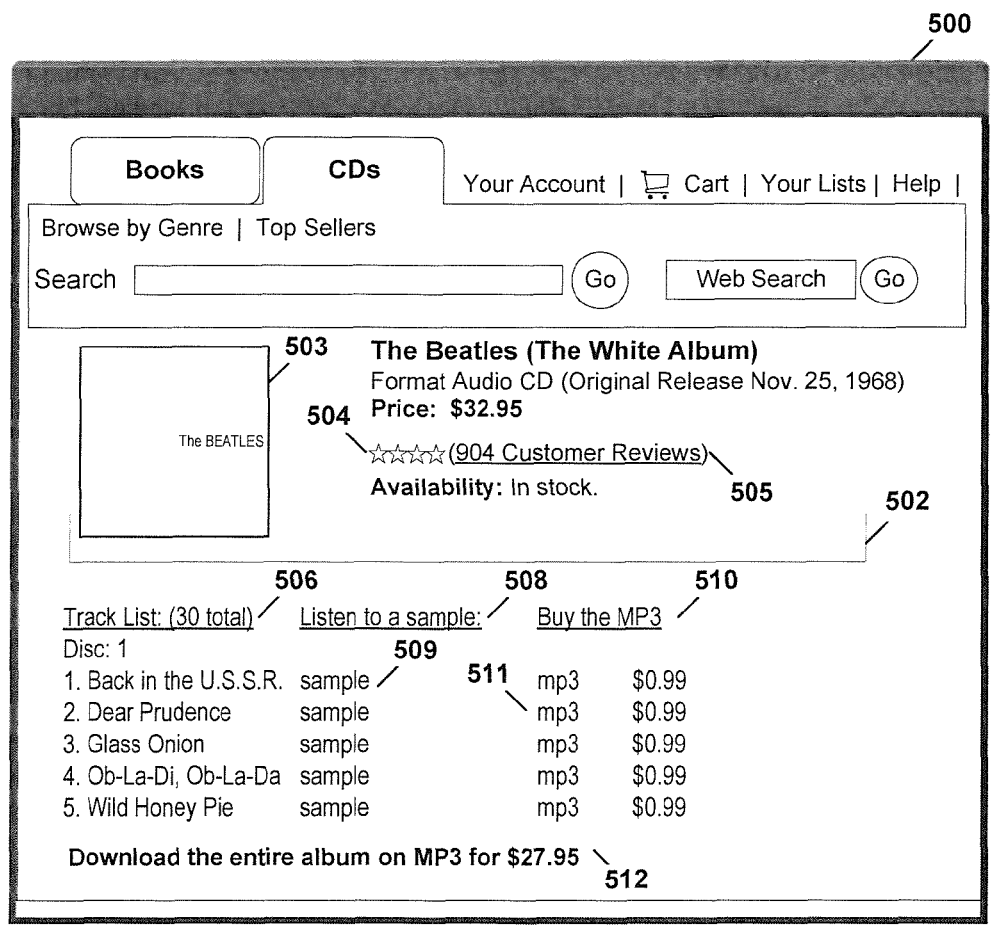
FIG. 5 is an illustration of a first embodiment of a user interface display utilizing linked media content information.

The display module 134 is adapted to generate data related to a user interface display including descriptive information related to a physical media product. An example of a user interface display generated via the display module 134 including physical media product descriptive information is illustrated in FIG. 5. The display module 134 may generate data related to the user interface display in response to a request from a user, such as the user 128, to view information related to the physical media product 120. In one embodiment, the display module 134 may send access information to the user 128 in response to receiving the request, where the access information permits access to a portion of the product catalog 112 associated with the respective physical media product 120. The user interface display may include a title, artist, genre, cover art, release data (such as a distribution company and release date), track list, reviews, other information stored at the product catalog 112, or any combination thereof, related to the physical media product 120.

Additionally, the display module 134 may access a link record related to the physical media product 120 to retrieve additional information from the download catalog 116 related to an electronic media product that corresponds to the physical media product 120. For example, the display module 134 may retrieve additional user reviews for a matching electronic media product and include reviews associated with both the physical media product 120 and the matching electronic media product in the user interface display. Further, the display module 134 may generate data related to a user display interface that also includes a user selectable sample link based on sample data included in a link record associated with the physical media product 120. The selection of the user selectable sample link may cause a portion of an electronic media product matching the physical media product 120 to be accessed from the electronic media database 114 for playback.

Figure 6:
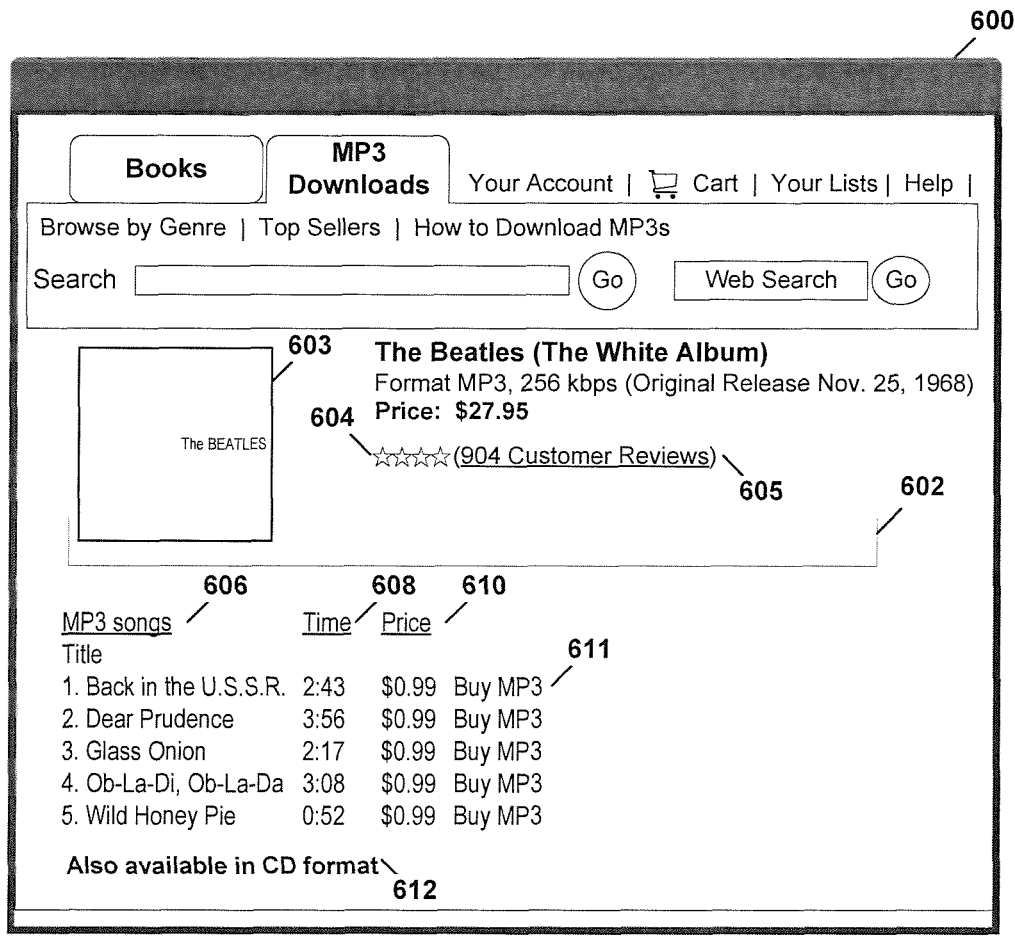
FIG. 6 is an illustration of a second embodiment of a user interface display utilizing linked media content information.

Additionally, the display module 134 may generate data related to a user interface display including descriptive information about an electronic media product. An example of a user interface display generated via the display module 134 including descriptive information associated with an electronic media product is illustrated in FIG. 6. The display module 134 may generate data related to the user interface display in response to a request from a user, such as the user 128, to view information related to the electronic media product 125. In one embodiment, the display module 134 may send access information to the user 128 in response to receiving the request, where the access information permits access to a portion of the download catalog 116 associated with the electronic media product 125. The user interface display may include a title, artist, genre, release data, such as a distribution company and release date, track list, reviews, other information stored at the download catalog 116, or any combination thereof, related to the electronic media product 125.

Additionally, the display module 134 may access a link record related to the electronic media product 125 to retrieve additional information from the product catalog 112 related to a physical media product that corresponds to the electronic media product 125. For example, the display module 134 may retrieve additional user reviews for a matching physical media product and include reviews associated with both the electronic media product 125 and the matching physical media product in the user interface display. Further, the display module 134 may access information from the product catalog 112 related to the matching physical media product, such as cover art, release data, or any combination thereof, that is not available for the electronic media product 125 and include this information in the user interface display.

The display module 134 may also be adapted to identify a location associated with the user 128 and to generate data related to the user interface display that includes information associated with a requested electronic media product or physical media product that is related to the location of the user 128. In an example, the user 128 may be located in a particular region of the world, such as Italy, and the display module 134 may receive data, such as an Internet Protocol (IP) address, associated with the user 128 indicating that the user is located in Italy. In another example, a profile of the user 128 may be accessed to identify a location of the user 128. After identifying the location of the user 128, the display module 134 may access the link data 136 to retrieve a link record related to a requested electronic media product or physical media product. The link record may indicate certain portions of the product catalog 112 or the download catalog 116 that include information associated with the requested electronic media product or physical media product that is related to the location of the user 128. The display module 134 may utilize the location based information to generate data related to a user interface display tailored to the location of the user 128. To illustrate, the display module 134 may generate data related to a user interface display when the user 128 is located in Italy, where the user interface display includes a release data of a particular physical media product in Italy, cover art associated with the particular physical media product as released in Italy, user reviews from other users in Italy, other location based descriptive information, or any combination thereof.

Figure 2:
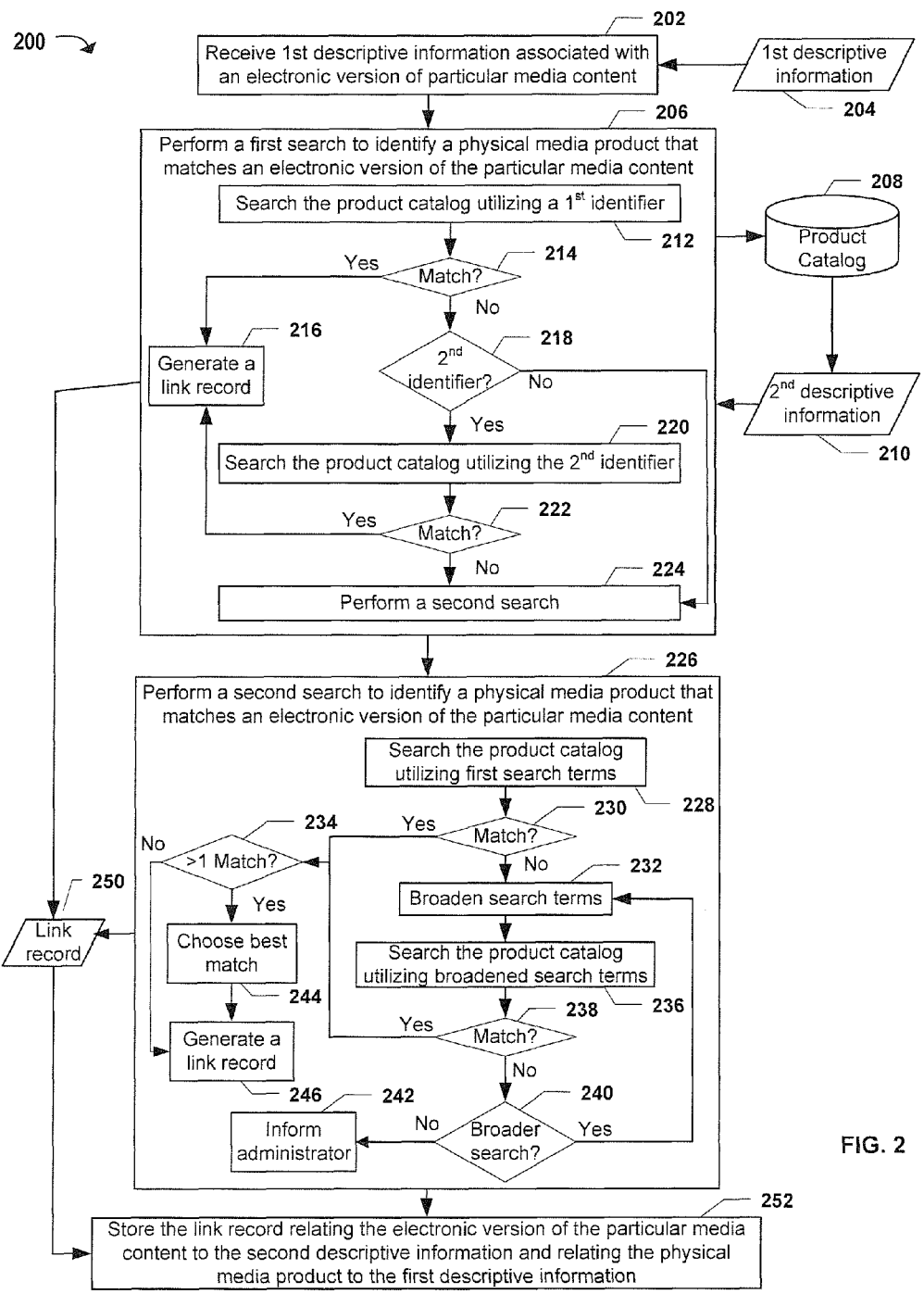
FIG. 2 is a flow chart of a first embodiment of a method of linking media content information.

FIG. 2 depicts a first embodiment of a method of linking media content information, where the method is designated generally 200. The method 200 includes, at 202, receiving first descriptive information 204 associated with an electronic version of particular media content, such as an MP3 formatted song or album or a digital video file. The first descriptive information 204 may include a universal product code (UPC), a European Article Number (EAN), a vendor identification number, a title, an artist, a genre, or any combination thereof.

The method 200 also includes at 206, performing a first search to identify a physical media product, such as a physical medium including video content, audio content, or any combination thereof, that matches the electronic version of the particular media content. The physical media product may include an audio optical disc, such as a compact disc (CD), a vinyl album, a cassette tape, a video tape, an optical video disc, such as a digital video disc (DVD) or a Blu-ray disc, or any combination thereof. At 212, the method 200 includes searching a product catalog 208 utilizing a first identifier. The first identifier may be included in the first descriptive information 204 and may include a UPC, an EAN, or a vendor identification number, such as an identification number assigned to the electronic version of the particular media content by an audio file service. The search of the product catalog 208 may include a lookup of the first identifier for an exact match of a corresponding identifier included in second descriptive information 210 stored at the product catalog 208. The second descriptive information 210 may include information related to the physical media product. For example, the second descriptive information 210 may include a UPC, an EAN, a vendor identification number, cover art, a track list, release data, reviews, title, artist, genre, or any combination thereof.

Proceeding to decision 214, the method 200 includes determining whether there is a match between the first identifier and a corresponding identifier of the second descriptive information 210. If there is a match, the method 200 advances to 216. If there is not a match, then the method moves to decision 218 and determines whether or not a second identifier is included in the first descriptive information 204. For example, the first identifier may include a UPC and the second identifier may include an EAN or vendor identification number. When there is not a second identifier, the method 200 proceeds to 224. If the first descriptive information 204 does include a second identifier, then the method 200 moves to 220. At 220, the product catalog 208 is searched utilizing the second identifier. In an illustrative embodiment, if there is not a matching UPC included in the second descriptive information, then an EAN or vendor identification number of the first descriptive information 204 may be compared with data included in the second descriptive information 210.

At decision 222, if there is a match between the second identifier and data included in the second descriptive information 210, then the method advances to 216. At 216, a link record 250 is generated and the method proceeds to 252. The link record 250 relates the electronic version of the particular media content to the second descriptive information 210 and relates the corresponding physical media product to the first descriptive information 204. For example, the link record 250 may point to memory locations in the product catalog 208 including portions of the second descriptive information 210 related to the physical media product that corresponds to the electronic version of the particular media content. Additionally, the link record 250 may point to memory locations in a download catalog (not shown) that includes information related to electronic media products, where the memory locations include the first descriptive information 204. In this way, an application utilizing information related to an electronic version of the particular media content, such as the display module 134 in FIG. 1, may also access information related to a physical media product corresponding to the electronic version of the particular media content and enhance a consumer's purchasing experience.

If the there is not a match between the second identifier and the second descriptive information 210 at 222, the method proceeds to 224. At 224, a second search is performed to identify a physical media product that matches an electronic version of the particular media content. The second search is detailed at 226 and includes, at 228, searching the product catalog 208 using first search terms. The first search terms may be included in the first descriptive information 204. For example, the first search terms may include a title related to the electronic version of the particular media content, such as a movie title, a song title or an album title, a primary artist related to the electronic version of the particular media content, or any combination thereof. To illustrate, a search of the product catalog 208 using the first search terms may include a search of the second descriptive information 210 for an unmodified title and a primary artist of the electronic version of the particular media content.

At decision 230, a determination is made as to whether the first search terms match data included in the second descriptive information 210. If there is a match, the method 200 proceeds to 234. For example, a match may occur when the second descriptive information 210 includes a title and primary artist included in the first search terms. On the other hand, if there is no match, the method advances to 232. At 232, the search terms are broadened and the method moves to 236 where the product catalog 208 is searched utilizing the broadened search terms. In an illustrative embodiment, the search terms may be broadened by searching only for the unmodified title or the title may be simplified by removing characters, symbols, spaces, or any combination thereof. The search terms may also be modified by changing the format of the search terms, such as to all capital letters or all lowercase letters. The method proceeds to decision 238. At decision 238, if there is not a match between the broadened search terms and the second descriptive information 210, then the method moves to decision 240. At decision 240, a determination is made as to whether or not a broader search can be performed. For example, a series of searches may be designated by an administrator of an online media store with each search being progressively broader. To illustrate, the search terms may be broadened by eliminating terms from the search, such as the primary artist. The search terms may also be broadened by simplifying the search terms, truncating the search terms, performing multiple searches using different portions of the search terms, or any combination thereof. When a broader search is available, the method returns to 232. On the other hand, when a broader search is not available, the method proceeds to 246 where an administrator may be informed that no matching physical media product has been identified for the electronic version of the particular media content.

From decision 238, if a match is identified between broadened search terms and the second descriptive information 210, the method advances to decision 234. At 234, if there is not more than one physical media product that has been identified as matching the electronic version of the particular media content, then the method 200 proceeds to 246. On the other hand, if there is more than one match at decision 234, the method 200 moves to 244. At 244, the best match is chosen. In a particular embodiment, the best match may be chosen by comparing a number of tracks of an electronic album related to the electronic version of the particular media content with the number of tracks of each matching physical media product. In another particular embodiment, the best match may be chosen by comparing a number of chapters of an electronic movie related to the electronic version of the particular media content with a number of chapters of each matching physical media product. In still other embodiments, the best match may be chosen by comparing track titles or chapter titles related to the electronic version of the particular media content with the track titles or chapter titles of each matching physical media product. A confidence indicator may be assigned to each matching physical media product and the physical media product with the highest confidence level may be deemed the best match. After choosing the best match, the method 200 proceeds to 246 where a link record 250 is generated relating the best matching physical media product with the electronic version of the particular media content. The method 200 advances to 252 where the link record 250 is stored in memory, such as the memory 108 of the server system 102 of FIG. 1.

Figure 3:
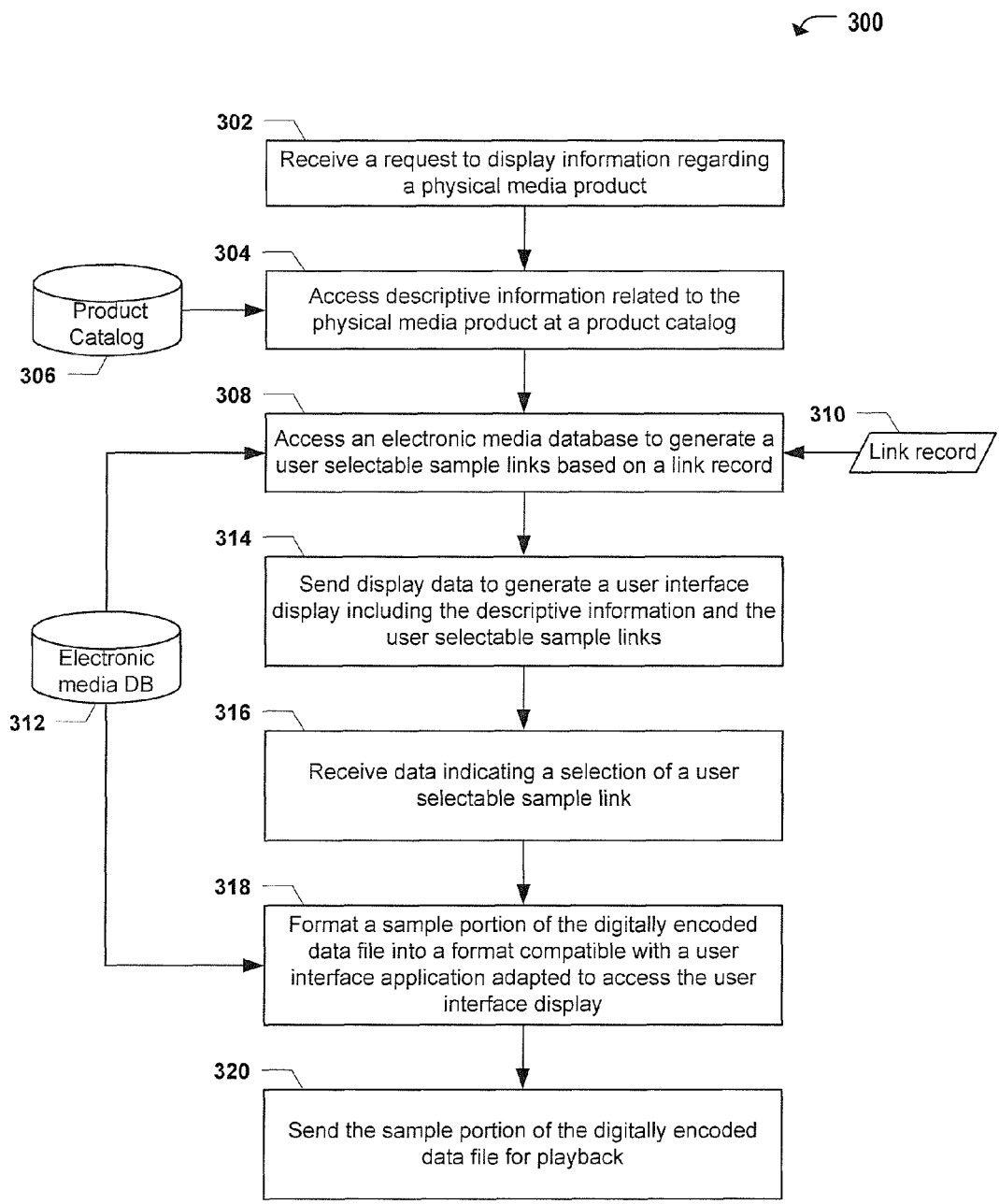
FIG. 3 is a flow chart of a second embodiment of a method of linking media content information.

FIG. 3 is a flow chart of a second embodiment of a method of linking media content information, where the method is generally designated 300. The method 300 includes, at 302, receiving a request to display information regarding a physical media product. For example, a user may request to display information regarding a CD or a DVD that the user is considering purchasing. Moving to 304, descriptive information related to the physical media product may be accessed at a product catalog 306. The descriptive information may include a title, release data, an artist, a full or partial track list, a price, an availability indicator, one or more reviews related to the physical media product, cover art, or any combination thereof.

At 308, an electronic media database 312 is accessed to generate user selectable sample links based on a link record 310. The link record 310 may relate the physical media product to one or more electronic media products. For example, the link record 310 may indicate that the physical media product is related to a particular electronic album or movie. In another example, the link record 310 may indicate a number of individual electronic songs that correspond to each of the tracks of the physical media product. The link record 310 may also include pointers to memory locations in the electronic media database 312 corresponding to the one or more electronic media products related to the physical media product.

The user selectable sample links may be generated based on the portions of the electronic media product that correspond to the physical media product. For example, a user selectable sample link may be generated for each track of an electronic album or each electronic song included in the electronic media database 312 that relates to a track or corresponding portion of the physical media product. Each user selectable sample link may be adapted to playback a portion of the corresponding electronic media product. The tracks of the physical media product may be matched to the electronic album based on a track number, a title, a playtime, other information related to each track, or any combination thereof. Similarly, chapters of the physical media product may be matched to an electronic movie based on a chapter number, a title, a playtime, other information relate to each chapter, or any combination thereof.

Proceeding to 314, display data is sent to generate a user interface display including the descriptive information and the user selectable sample links. An example of a user interface display including information regarding a physical media product is illustrated in FIG. 5. Moving to 316, data is received indicating a selection of a user selectable sample link included in the user interface display. To illustrate, a user may select a sample link related to a particular track of a CD. The method 300 advances to 318, where a sample portion of a digitally encoded data file is formatted into a format compatible with a user interface application adapted to access the user interface display. In an illustrative embodiment, a sample portion, such as 15 or 30 seconds, of a digitally encoded data file corresponding to a particular portion of the physical media product is formatted according to a media playback application executable via a user web browser. Proceeding to 320, the sample portion of the digitally encoded data file is sent to the user for playback.

Figure 4:
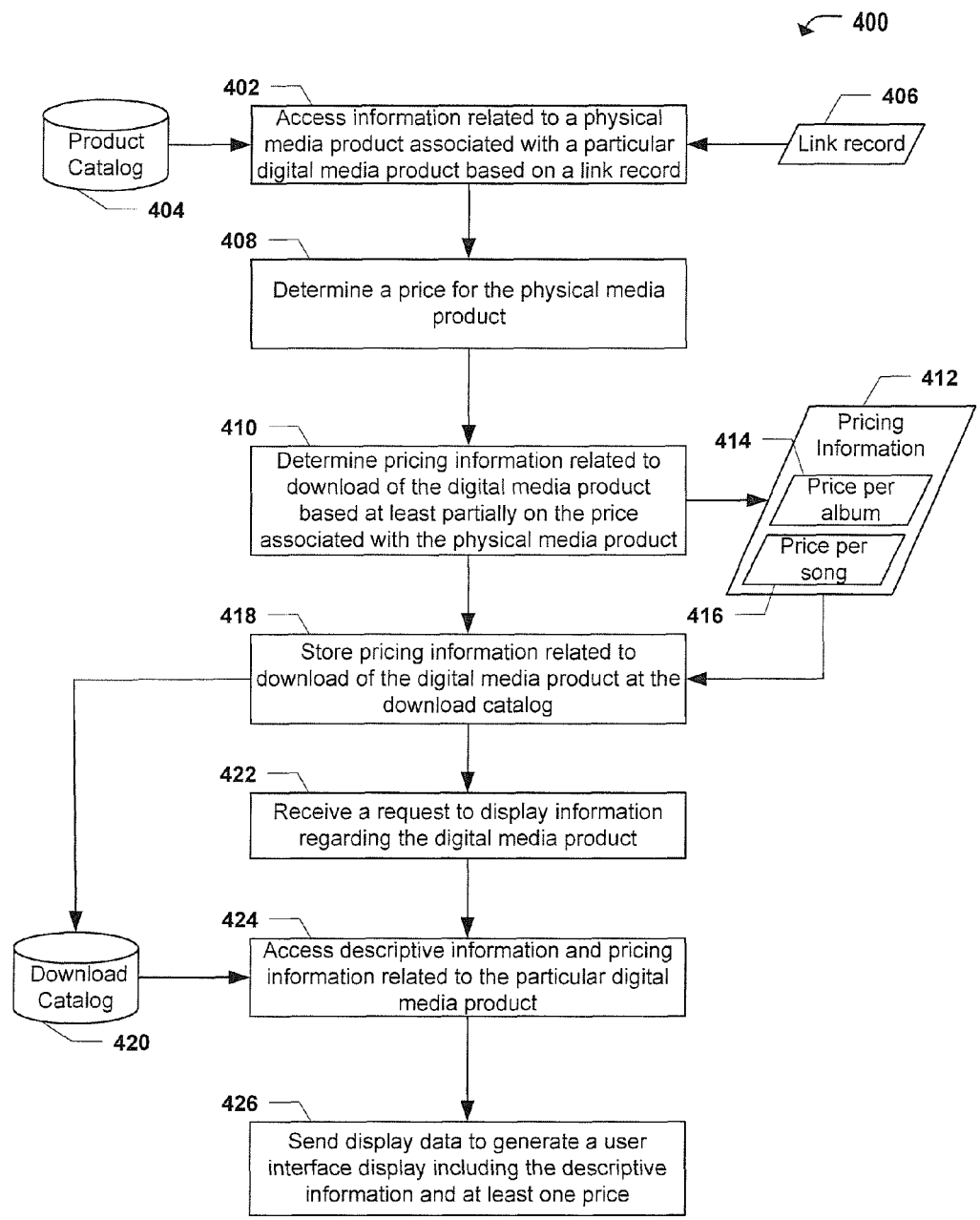
FIG. 4 is a flow chart of a third embodiment of a method of linking media content information.

FIG. 4 is a flow chart of a third embodiment of a method of linking media content information, where the method is generally designated 400. The method 400 includes, at 402, accessing information from a product catalog 404 based on a link record 406, where the information is related to a physical media product associated with a particular electronic media product. The link record 406 can be used to determine pricing of the particular electronic media product. For example, the pricing for the electronic media product can be determined based on pricing related to a corresponding physical media product.

Advancing to 408, a price for the physical media product is determined and moving to 410, pricing information 412 related to download of the electronic media product is determined based at least partially on the price associated with the physical media product. In a particular embodiment, the pricing information 412 of the electronic media product may include a price per movie, a price per episode, a price per album 414, a price per song 416, or any combination thereof. In an illustrative, non-limiting embodiment, the price per electronic album 414 may be less than the price of the corresponding compact disc (CD). Additionally, the price per song 416 may be determined such that downloading each song associated with the CD would cost less than purchasing the CD. Pricing for electronic video products may also be determined such that the price to download the electronic video product is less than the price to purchase the corresponding physical media product, such as a digital video disc (DVD). Moving to 418, the pricing information 412 is stored at a download catalog 420. The download catalog 420 includes information related to the electronic media product, such as the pricing information 412, a title, an artist, a genre, other descriptive information, or any combination thereof.

The method 400 includes, at 422, receiving a request to display information regarding the electronic media product. For example, an online media store may receive a request for information from a user related to an electronic movie, an electronic album or a digitally encoded song. The method moves to 424, where descriptive information and pricing information related to the electronic media product are accessed from the download catalog 420. Advancing to 426, display data is sent to generate a user interface display that includes the descriptive information and at least one price related to the electronic media product. An example of a user interface display associated with an electronic media product is illustrated in FIG. 6.

FIG. 5 is an illustration of a first embodiment of a user interface display utilizing linked media content information. The user interface display is generally designated 500 and may be generated via the system 100 illustrated in FIG. 1. The user interface display 500 provides access to information related to one or more compact discs (CDs); however, in another embodiment, the user interface display 500 includes information related to one or more digital video discs (DVDs). In particular, the user interface display 500 includes descriptive information 502 related to the one or more CDs. For example, the descriptive information 502 includes a first title, "The Beatles," and a second title, "The White Album." The descriptive information 502 also includes a format, "audio CD," release data, "Original Release Nov. 25, 1968," and pricing information, "$32.95." The descriptive information 502 may also include cover art 503, information related to customer reviews 504, a link to access the customer reviews 505, and availability information, "In stock," other information related to the physical media product, or any combination thereof.

The user interface display 500 also includes a partial track list 506 and one or more user selectable sample links 508. Each of the user selectable sample links 508 is adapted to playback a sample portion of the track associated with the respective user selectable sample link. For example, selection of the user selectable sample link 509 may execute a media playback application to play a portion, such as 15 seconds, of the song "Back in the U.S.S.R." Further, the user interface display 500 includes one or more user selectable options to purchase an MP3 formatted digitally encoded audio file related to a particular track of the CD and the respective price associated with the purchase of the respective MP3 file. To illustrate, selection of an option 511 may initiate display of an additional user interface display related to purchasing an MP3 formatted digitally encoded audio file including the song "Dear Prudence," for $0.99. Additionally, the user interface display 500 includes a user selectable link 512 adapted to initiate download of an electronic album formatted according to the MP3 format that corresponds to The Beatles White Album for a particular price. "$27.95."

In a particular embodiment, selection of one of the user selectable sample links 509 may cause a sample portion of an electronic media product corresponding to the physical media product to be played. For example, the electronic album may be stored in an electronic media database. When the electronic album is purchased for download, a copy of the digitally encoded audio files corresponding to the electronic album may be sent from the electronic media database. Additionally, when a sample of one of the songs is requested, the sample may be taken from the same digitally encoded audio files.

FIG. 6 is an illustration of a second embodiment of a user interface display utilizing linked media content information. The user interface display is generally designated 600 and may be generated via the system 100 illustrated in FIG. 1. The user interface display 600 provides access to information related to downloading digitally encoded audio files formatted according to the MP3 format; however, in another embodiment, the user interface display includes information related to digitally encoded video files. In particular, the user interface display 600 includes descriptive information 602 related to download of a particular electronic media product. For example, the descriptive information 602 includes a first title, "The Beatles," and a second title, "The White Album." The descriptive information 602 also includes a format, "MP3," a bit rate used to encode the file, "256 kbps," release data, "Original Release Nov. 25, 1968," and pricing information, "$27.95." The descriptive information 602 may also include cover art 603, information regarding customer reviews 604, a link to access the customer reviews 605, and availability information, "In stock," other information regarding the electronic media product, or any combination thereof. In a particular embodiment, at least a portion of the descriptive information 602 may be retrieved from descriptive information related to a physical media product related to the electronic media product.

The user interface display 600 also includes a list of songs 606 related to the album "The Beatles," a list of playing times of each song 608, and a list of prices associated with each song 610. The user interface display 600 also includes one or more user selectable options, such as the user selectable option 610, related to the purchase of a digitally encoded audio file related to a particular song, such as the song "Back in the U.S.S.R." Additionally, the user interface display 600 includes a user selectable link 612 adapted to provide an additional user interface display related to purchase of a CD that includes media content associated with "The Beatles" album.

In a particular embodiment, the steps of the methods described herein are executed in the order shown by the figures. In alternative embodiments, the steps may be executed in alternative sequences.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Additionally, wireless networks and network protocols may be used in place of or in addition to wired networks and network protocols. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method comprising:
   as implemented by one or more computing devices configured with specific executable instructions,
   receiving first descriptive information associated with an electronic version of a particular media content;
   searching a data store, based at least in part on the first descriptive information, to identify second descriptive information associated with a physical media product, wherein the physical media product includes the particular media content, and wherein the second descriptive information includes information about the particular media content that is not included in the first descriptive information;
   storing a data record relating the electronic version of the particular media content to the second descriptive information associated with the physical media product and identified by searching the data store;

receiving a request for information related to the electronic version of the particular media content; and in response to the request, accessing the data record relating the electronic version of the particular media content to the second descriptive information associated with the physical media product; and generating instructions for presenting a user interface that includes at least a portion of the first descriptive information and at least a portion of the second descriptive information.

2. The computer-implemented method of claim 1, wherein the data record relates the physical media product to the first descriptive information.

3. The computer-implemented method of claim 1, wherein the particular media content includes a recorded musical performance, wherein the first descriptive information includes information descriptive of the recorded musical performance, and wherein the second descriptive information includes information descriptive of a compilation including the recorded musical performance.

4. The computer-implemented method of claim 3, wherein the first descriptive information includes a title and an artist of the recorded musical performance.

5. The computer-implemented method of claim 3, wherein the second descriptive information includes at least one of:

cover art associated with the compilation;

a track list associated with the compilation; or a release date associated with the compilation.

6. One or more non-transitory computer-readable storage media storing computer executable instructions that, when executed by one or more computing devices, configure the one or more computing devices to perform operations comprising:

receiving first descriptive information associated with an electronic version of particular media content;

identifying, based at least in part on the first descriptive information, second descriptive information, wherein the second descriptive information is associated with a physical media product and includes information about the particular media content that is not included in the first descriptive information, and wherein the physical media product includes the particular media content;

in response to identifying the second descriptive information, storing a data record relating the electronic version of the particular media product to the identified second descriptive information associated with the physical media product;

receiving a request for information related to the particular media product;

accessing the data record relating the electronic version of the particular media product to the second descriptive information associated with the physical media product; and providing at least a portion of the first descriptive information and at least a portion of the second descriptive information for presentation at least partly in response to the request.

7. The computer-implemented method of claim 6, wherein the second descriptive information comprises a review expressing an opinion regarding the particular media content.

8. The one or more non-transitory computer-readable storage media of claim 6, wherein the electronic version of the particular media content comprises a digitally encoded audio data file.

9. The one or more non-transitory computer-readable storage media of claim 6, the operations further comprising sending, at least partly in response to the request for information, access information to permit access to a portion of an electronic catalog associated with the physical media product that stores the particular media content.

10. The one or more non-transitory computer-readable storage media of claim 6, the operations further comprising:

receiving a request to display information regarding the physical media product that stores the particular media content; and sending, at least partly in response to the request, access information to permit access to a portion of an electronic catalog associated with the electronic version of the particular media content.

11. The one or more non-transitory computer-readable storage media of claim 6, wherein the particular media content includes a movie, wherein the first descriptive information includes information descriptive of an electronic version of the movie, and wherein the second descriptive information includes information descriptive of a digital video disc (DVD) including the movie.

12. A system comprising:

an electronic data store configured to store description information regarding physical media products; and one or more computing devices in communication with the electronic data store, the one or more computing devices configured at least:

receive first descriptive information associated with an electronic media product, the electronic media product comprising an electronic version of particular media content;

search the electronic data store using the first descriptive information associated with the electronic media product to identify second descriptive information associated with a physical media product, wherein the physical media product includes the particular media content, and wherein the second descriptive information includes information about the particular media content that is not included in the first descriptive information;

generate a data record relating the electronic media product to the second descriptive information associated with the physical media product and identified by searching the electronic data store;

receive a request for information related to the electronic media product; and in response to the request, access the data record relating the electronic media product to the second descriptive information associated with the physical media product; and generate instructions for presenting a user interface display that includes at least a portion of the first descriptive information and at least a portion of the second descriptive information.

13. The system of claim 12, wherein the search of the electronic data store comprises:

determining a first identifier based at least in part on the first descriptive information;

searching, using the first identifier, the electronic data store to identify a physical product including the particular media content;

when a physical media product that stores the particular media content is not identified by searching using the first identifier, determining a second identifier based at least in part on the first descriptive information; and searching, using the second identifier, the electronic data store to identify the physical product including the particular media content.

14. The system of claim 13, wherein at least one of:
the first identifier includes a unique identification code associated with the particular media content; or
the first descriptive information includes a unique identification code associated with the physical media product that stores the particular media content, and wherein the first identifier includes the unique identification code.

15. The system of claim 13, wherein one or more computing devices are further configured to at least:
determine one or more first search terms based at least in part on at least a portion of the first descriptive information when no physical media product storing the particular media content is identified by searching using the first identifier and the second identifier; and
search the electronic data store using the first search terms to identify second descriptive information associated with a physical media product.

16. The system of claim 15, wherein the one or more first search terms include a title associated with the particular media content.

17. The system of claim 15, wherein one or more computing devices are further configured to at least:
determine one or more second search terms based at least in part on at least a portion of the first descriptive information when no physical media product storing the particular media content is identified by searching using the first search terms; and
determine whether the one or more second search terms correspond to at least a portion of the second descriptive information.

18. The system of claim 17, wherein the one or more second search terms are at least one of:
broader than the one or more first search terms; or
a partial title associated with the particular media content.

19. The system of claim 15, wherein one or more computing devices are further configured to at least compare a number of tracks associated with the physical media product with a number of tracks associated with the electronic media product when the one or more first search terms are included in the electronic data store.

20. The system of claim 19, wherein one or more computing devices are further configured to at least compare one or more track titles associated with the physical media product with one or more track titles associated with the electronic media product.

\* \* \* \* \*